Figure 1:
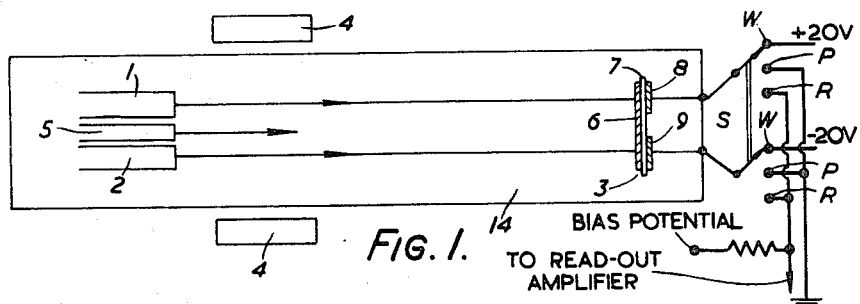

July 24, 1962 E. B. B. CALLICK ETAL 3,046,440

SIGNAL STORAGE ARRANGEMENTS

Filed March 4, 1960

INVENTORS
Eric Brian Butler Callick
and
Jervois Campbell Firmin
BY Baldwin & Wight
ATTORNEYS

United States Patent Office 3,046,440
Patented July 24, 1962

3,046,440
SIGNAL STORAGE ARRANGEMENTS
Eric Brian Butler Callick, Chelmsford, and Jervois Campbell Firmin, Little Baddow, England, assignors to English Electric Valve Company Limited, London, England, a British company
Filed Mar. 4, 1960, Ser. No. 12,826
Claims priority, application Great Britain June 26, 1959
12 Claims. (Cl. 315—8.5)

The invention relates to signal storage arrangements and more particularly to storage arrangements employing signal storage tubes.

It is often required to develop signals in dependence upon the algebraic sum of simultaneously occurring positive and negative signals and it is, further, often required e.g. in radar systems, to integrate periodically related signals which may be positive or negative and which may include simultaneously occurring positive and negative signals. Where such positive and negative signals are subject to large variations in amplitude, as is frequently the case, these are difficult tasks to perform with accuracy and known arrangements for performing these tasks are complex and costly. It is the object of the present invention to provide improved arrangements for performing the above-mentioned tasks while avoiding the defects of known arrangements.

According to this invention in its broadest aspect a signal storage tube adapted for use in a signal storage arrangement fed with positive and negative going signals includes a storage target having a plurality of discrete storage elements; means, including means for scanning said storage target with two signal modulated beams, for storing charges on said elements in dependence on the amplitude difference between simultaneously occurring modulating signals and means for taking off the stored charges.

Normally the modulating signals will be positive but if it is desired to use negative going signals this may obviously be done and the same overall result achieved by applying positive bias to the means whereby the storage target is scanned (the two so-called "writing" guns) so that the signals are, in effect, subtracted from the bias. Reference herein to positive modulating signals are therefore to be broadly construed, where the context so permits, to include this equivalent arrangement of negative signals and positive bias on the guns.

The signals which are dependent on the positive signals fed to the signal storage arrangement are arranged to modulate one beam and the signals dependent on the negative signals, and rendered positive in known manner, are arranged to modulate the other beam.

According to a preferred feature of this invention a signal storage tube adapted for use in a signal storage arrangement fed with positive and negative signals comprises a storage target having a plurality of discrete conductive storage elements, two control electrodes closely adjacent to but spaced from said elements by material which is normally an insulator but which exhibits conductivity under the impact of an electron beam and which extends between and in contact with said control electrode and said elements; means for providing two so-called "writing" electron beams adapted to be scanned simultaneously across said storage target in such manner that one beam scans said material intermediate said elements and one control electrode while the other beam scans said material intermediate said elements and the other control electrode; means for modulating said beams in accordance with applied positive signals and means including a so-called "reading" electron beam adapted to be scanned across said elements, for taking off stored signals from said storage target.

Materials which are normally insulators but which exhibit conductivity under the impact of an electron beam are well-known per se and are commonly referred to as exhibiting the B.I.C. (bombardment induced conductivity) effect or the E.B.C. (electron bombardment conductivity) effect. For the sake of brevity such materials will be referred to throughout this specification as B.I.C. materials.

One form of storage target for use in a storage tube in accordance with a feature of this invention comprises an insulating plate carrying a layer of B.I.C. material having a plurality of strip-like metallic elements or islands arranged side by side on one side thereof and a pair of strip-like metallic control electrodes arranged on the other side thereof, said control electrodes being separated from one another and transverse to said elements or islands and each extending from near the centres of said elements or islands to beyond their ends.

A second form of storage target comprises an insulating plate carrying a layer of B.I.C. material having a plurality of strip-like metallic elements or islands arranged side by side on one side thereof, a pair of strip-like metallic control electrodes arranged transverse to and spaced from said elements or islands and on the same side of said B.I.C. layer as said elements or islands, said control electrodes being positioned outwardly of the ends of said elements or islands one on one side and one on the other and a strip-like metallic signal plate mounted on the opposite side of said layer from said elements or islands and transverse and opposite thereto.

A third form of storage target comprises a layer of insulating material carried on a metallic signal plate, the layer of insulating material having mounted thereon on the side opposite the signal plate a plurality of strip-like metallic elements or islands arranged side by side, two strip-like metallic control electrodes arranged transverse to said elements or islands outwardly of the ends thereof, one on one side and one on the other, and a layer of B.I.C. material extending between and in contact with each control electrode and the ends of the elements or islands adjacent thereto.

A signal storage arrangement comprises a signal storage tube in accordance with the preferred feature of this invention, means for applying positive modulating signals to said tube to modulate one "writing" beam in dependence upon positive signals fed to said arrangement, means for applying positive modulating signals to said tube to modulate the other "writing" beam in dependence upon negative signals fed to said arrangement, means for scanning said "writing" beam simultaneously across said storage target in such manner that one beam scans said material between one of said control electrodes and said elements while the other scans said material between the other control electrode and said elements; means for applying two voltages of opposite polarity to said control electrodes, one to one and the other to the other, during "writing," means for subsequently scanning said "reading" beam across said elements; and means for taking output signals from said target structure. Preferably said two voltages of opposite polarity are of equal magnitude.

Preferably said means for taking output signals from said target structure include means for applying a single potential to both said control electrodes, and to said signal plate where it is included in said target structure, during "reading" and means for taking output signals from said control electrodes or from said signal plate, as the case may be.

Figure 2:
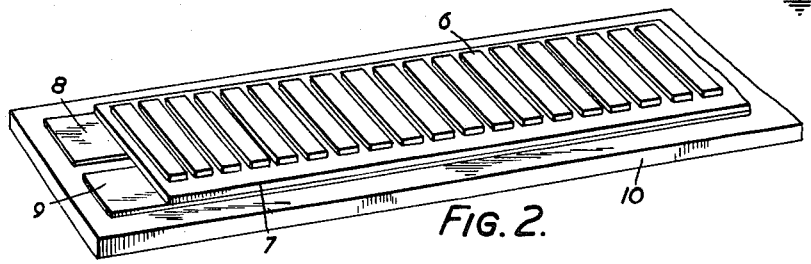
Figure 3:
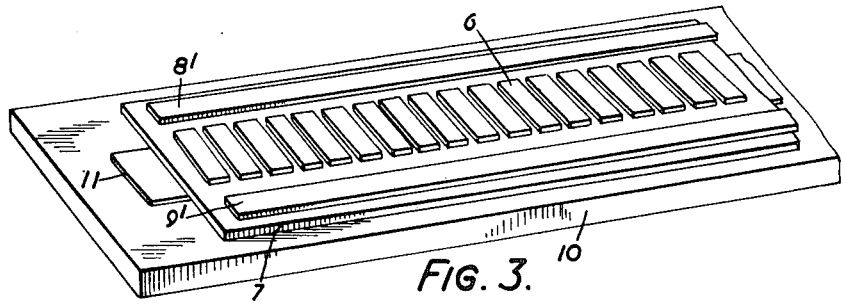
Figure 4:
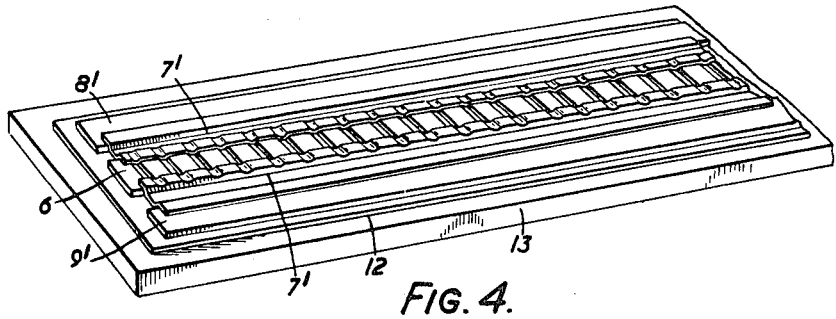

The invention is illustrated in the accompanying drawings wherein FIG. 1 shows diagrammatically a signal storage tube in accordance with the invention, FIG. 2 shows in detail a storage target used in the embodiment of FIG. 1, and FIGS. 3 and 4 show other storage targets which may be used, with suitable modifications of the associated connections, in place of the arrangement of FIG. 2.

Throughout the drawing like parts are denoted by like references.

Referring to FIG. 1 there is shown a storage tube 14 having two similar "writing" electron guns 1 and 2, which are as well known and whose construction is not shown in detail, each of which projects an electron beam on to a storage target 3.

The storage target, which is shown in more detail in FIG. 2, comprises a number of strip-like metallic islands 6, which may be, for example, of gold, deposited on a layer 7 of B.I.C. material. On the other side of the layer 7 from the islands 6 are placed two metallic control electrodes 8 and 9, each of which is so disposed as to overlap each of the islands 6 for just under half the length of the latter, the whole arrangement being supported on an insulating plate 10. The storage target may conveniently be made by evaporation and/or chemical deposition of the islands and control electrodes on the layer 7, which may itself be formed by evaporation.

A further electron gun 5, the reading gun, also projects an electron beam on to the storage target 3, all of the electron beams being suitably deflected, in a manner to be described hereafter, by any convenient deflection means, such means being conventionally represented here by the coil 4. The two control electrodes of the target 3 are separately connected to the two ganged wipers of a switch S and in operation these wipers are initially set to the position P, in which position both control electrodes are connected to earth. At this time the "writing" beams are switched off and the "reading" beam is made to scan along the target structure at the centre of the islands 6, i.e. in a direction perpendicular to the plane of the drawing in FIG. 1. The velocity of the "reading" beam is such as to be below the so-called "first cross-over" of the secondary emission characteristic of the islands 6, whereby the number of electrons emitted from the islands 6 by secondary emission is less than the number of electrons deposited thereon by the beam, so that the islands 6 are stabilised at the cathode potential of the "reading" gun. As an alternative method of the stabilising the potential of the islands the "reading" gun may be switched off and the "writing" beams made to scan the storage target with both of the control electrodes 8 and 9 connected to a source of potential equal the potential of the cathode of the reading gun. The potential of the islands then becomes the same as that of the control electrodes due to the so-called "B.I.C. effect" the mechanism by which this stabilising is effected being the same as that by which "writing" is carried out and which is described hereafter.

The "reading" gun is now switched off and the switch S moved to the position W whereby positive and negative voltages of equal value are applied to the control electrodes 8 and 9 respectively. These voltages are shown to be +20 v. and −20 v. respectively, but it is to be understood that these values are purely exemplary and in no sense limiting. The two "writing" beams are now switched on and made to scan simultaneously along the ends of the islands 6, the "writing" beam from the gun 1 scanning the target opposite the control electrode 8 and the other opposite the control electrode 9, in such a way that the beams impinge on the ends of the islands and/or on the layer 7 outwardly of the ends of the islands 6.

To the control grids (not separately shown) of the electron guns 1 and 2 are applied the signals which are to be stored to modulate the "writing" beams, all the signals corresponding to those of positive polarity being applied to one gun and all the signals corresponding to those of negative polarity being applied to the other. Normally all signals, no matter to which electron gun they are applied, are applied in the positive sense, i.e. the negative polarity signals are converted into signals of positive polarity before being applied to the electron gun 2, though, as previously explained herein, negative signals may be used if the writing guns are suitably biassed positively so that, in effect, the signals are subtracted from the bias. If the signals, which it is desired to store do not exist separately as positive and negative signals, they may be so separated in well known manner.

When the "writing" beams impinge on the target 3 the layer 7 becomes conductive over the area on which the beams impinge to an extent dependent on the level of modulation of the "writing" beams. Hence, when an area of the layer 7 is impacted by the beam it is rendered conductive and the island adjacent thereto will assume a positive potential, by conduction between that island and the positively biassed control electrode 8, the value of the potential on the island being determined by the extent of modulation of the beam and the time for which the area of the layer 7 adjacent to the island in question is subjected to bombardment. Conversely, if an area of the layer 7 adjacent to that island is impacted by the modulated beam from the gun 2, the island will adopt a negative potential derived from the control electrode 9. Clearly, therefore, if the two beams are simultaneously modulated the appropriate island will adopt a potential dependent on the difference in the levels of the two modulating signals.

If it is desired only to store or read-out signals corresponding to algebraic sum of the original signals then the "writing" beams need only be scanned once across the target surface before reading out. If it is desired to integrate signals occurring in some periodic relationship, however, and possibly to eliminate random signals, then the "writing" beams may be arranged to scan the storage target an appropriate number of times before reading out. Thus if a particular island is raised to a small potential on one scan and corresponding signals are applied to the "writing" guns at corresponding times during successive scans, then the potential of the island in question will increase on successive scans, the increase in potential being substantially linear so long as the potential to which the island is raised is small with respect to the potentials applied to the control electrodes 8 and 9. Furthermore if the signals applied to the "writing" guns at corresponding times during successive scans change their values in random manner the potential of the appropriate island is likely to remain small.

When "writing" is completed the writing beams are switched off and the switch S moved to the position R, whereby positive bias potential of a value greater than that of the maximum potential of either polarity achieved by any of the islands of the storage target is applied, in series with the output load, to the control electrodes 8 and 9. The "reading" beam is now switched on and is caused to scan successively across the centres of all the islands 6 of the storage target, as before. As the area of the layer 7 now impinged by the beam is small the B.I.C. effect is negligible and the layer 7 acts substantially as an insulator. The islands will now collect electrons from the beam in dependence upon their potentials and output signals corresponding to the previously stored charges will be developed across the output load and may be taken to any convenient utilisation means, means being provided for removing the bias potential from the signals. The switch S is now moved to the position P assuming the "reading gun" cathode to be at earth potential and the beam again scanned across the storage target to stabilise the island potentials at the potential of the "reading" gun cathode as before.

FIG. 3 shows an alternative form of the storage target in which the control electrodes, here referenced 8' and 9' are mounted on the same side of the layer 7 as the islands 6, a separate signal plate 11 being mounted on the other side of the layer 7 and opposite the islands 6. When using a storage target of this construction the biassing potential employed when reading-out is connected in series with the output lead to the signal plate 11, from which output signals are derived, and may be connected to the electrodes 8' and 9'.

FIG. 4 shows a further form of storage target in which the islands 6 and control electrodes 8' and 9' are similarly disposed relative to one another as in the arrangement of FIG. 3 but carried on an insulating layer 12. Two layers 7' of material exhibiting the so-called B.I.C. effect are positioned between the ends of the islands 6 and the control electrodes 8' and 9' and overlapping the edges thereof. The insulating layer 10 may have deposited on the other side from the islands 6 a metallic film comprising the signal plate 11 or the signal plate may and, as shown does, comprise a solid metal backing plate 13 on which the layer 12 is carried.

Although the "reading" beam has been described above as having a velocity below that of the so-called "first secondary emission cross-over" this is not essential and the same result may be achieved by operating the beam at a velocity above the so-called "second cross-over." Alternatively the beam may be arranged to operate between the two so-called "cross-overs" so that the secondary emission from the islands 6 exceeds the collection of electrons thereon. The secondary electrons may be collected by positively biased electrode such as an apertured mesh electrode situated close to the target, placed in and around the path of the beam. In this case the islands will accumulate positive charge on reading out and therefore the read-out bias applied to the control electrodes 8 and 9, in the embodiment described with reference to FIG. 1, would be negative.

The operation of the reading beam above the first "cross-over" has the advantage that difficulties of focusing and deflection experienced with low velocity beam are reduced or avoided. The use of a low velocity beam, operating below the first "cross-over," however, allows an alternatively reading-out process to that described with reference to FIG. 1, to be used in which the "reading" beam gives up electrons to the storage target, in dependence upon the potentials stored thereon, the remaining electrons in the beam being then reflected from the storage target and collected by suitable electrodes from which the stored information is obtained. This alternative reading-out process requires no further description here as is similar to that carried out in the well-known "image orthicon" television camera tube.

Although the arrangement of FIG. 1 has been described as having three separate electron guns, clearly this is not a necessity. The two "writing" beams may be derived from a single electron gun whose electron beam is split in well known manner, the two parts of the split beam being separately modulated by the signals which are to be stored. Also in some arrangements a separate "reading" gun will not be necessary as one or both of the "writing" guns may be used also for "reading."

We claim:

1. A signal storage tube adapted for use in a signal storage arrangement fed with positive and negative going signals, said tube including a storage target having a plurality of discrete storage elements including a B.I.C. material, means for scanning said storage target with two beams, means for modulating one of said beams with a positive going signal and means for modulating the other of said beams with a negative going signal for storing charges on said elements in accordance with the amplitude difference between said two modulating signals, and reading means for deriving an output from the stored charges.

2. A signal storage tube adapted to provide output signals representative of the difference in amplitude of modulating signals applied thereto, said tube comprising a storage target having a plurality of discrete conductive storage elements, two control electrodes closely adjacent to but spaced from said elements by B.I.C. material which under the impact of an electron beam and which extends is normally an insulator but which exhibits conductivity between and in contact with each control electrode and said elements and means for applying different bias potentials to said control electrodes; means for providing two writing electron beams adapted to be scanned simultaneously across said storage target in such manner that one beam scans said material intermediate said elements and one control electrode while the other beam scans said material intermediate said elements and the other control electrode; means for modulating said beams in accordance with applied positive signals whereby said elements adopt potentials intermediate said bias potentials and representative of the difference in amplitude of said modulating signals and means including a reading electron beam adapted to be scanned across said elements, for taking off stored signals from said storage target.

3. A tube as claimed in claim 2 having a storage target comprising an insulating plate carrying a layer of B.I.C. material having a plurality of strip-like metallic elements or islands arranged side by side on one side thereof and a pair of strip-like metallic control electrodes arranged on the other side thereof, said control electrodes being separated from one another and transverse to said elements or islands and each extending from near the centres of said elements or islands to beyond their ends.

4. A tube as claimed in claim 2 having a storage target comprising an insulating plate carrying a layer of B.I.C. material having a plurality of strip-like metallic elements or islands arranged side by side on one side thereof, a pair of strip-like metallic control electrodes arranged transverse to and spaced from said elements or islands and on the same side of said B.I.C. layer as said elements or islands, said control electrodes being positioned outwardly of the ends of said elements or islands one on one side and one on the other and a strip-like metallic signal plate mounted on the opposite side of said layer from said elements or islands and transverse and opposite thereto.

5. A tube as claimed in claim 2 having a storage target comprising a layer of insulating material carried on a metallic signal plate, the layer of insulating material having mounted thereon on the side opposite the signal plate a plurality of strip-like metallic elements or islands arranged side by side, two strip like metallic control electrodes arranged transverse to said elements or islands outwardly of the ends thereof, one on one side and one on the other, and a layer of B.I.C. material extending between and in contact with each control electrode and the ends of the elements or islands adjacent thereto.

6. A signal storage arrangement adapted to provide output signals representative of the difference in amplitude of simultaneously occurring signals in two sets of signals applied thereto and comprising a signal storage tube having a storage target including a plurality of discrete conductive storage elements and two control electrodes, means for feeding bias potential to said control electrodes, B.I.C. material which extends between and in contact with each control electrode and said storage elements, means for providing two writing electron beams, means for modulating said writing beams and a take-off arrangement for signals stored on said storage target and including means for providing a reading electron beam; means for applying the one set of signals to modulate one writing beam and means for applying the other set of signals to modulate the other writing beam; means for applying bias potentials to said control electrodes; means for deflecting both said writing beams simultaneously across said storage target in such manner that one writing beam scans said B.I.C. material intermediate one control electrode and said elements and the other writing beam scans said material intermediate the other control electrode and said elements thereby to cause said elements to adopt potentials intermediate said bias potentials and representative of the difference in amplitude of the modulating signals of said two sets and means for subsequently deflecting said reading beam across the elements of said storage targets to provide output signals representative of the potentials of said elements.

7. An arrangement as claimed in claim 6, wherein said bias potentials are of opposite polarity and equal magnitude.

8. An arrangement as claimed in claim 6, wherein said stored signal take-off arrangement includes means for applying, simultaneously with the scanning of the reading beam across the target, a single bias potential to both said control electrodes and means for taking output signals from said control electrodes.

9. An arrangement as claimed in claim 6, wherein said storage target is provided with an additional signal plate and wherein said stored signal take-off arrangement includes means for applying a bias potential to said signal plate and means for taking output signals from said signal plate simultaneously with the scanning of the reading beam.

10. A signal storing arrangement comprising a signal storage tube having a storage target including a layer of insulating material carried on a metallic signal plate, the layer of insulating material having mounted thereon on the side opposite the signal plate, a plurality of strip-like metallic elements arranged side by side, two strip-like metallic control electrodes arranged transverse to said elements or islands outwardly of the ends thereof, one on one side and one on the other, and a layer of B.I.C. material extending between and in contact with each control electrode and the ends of the elements or islands adjacent thereto; and means for producing a pair of writing beams, means for producing a reading beam, means for applying positive modulating signals to said tube to modulate the other writing beam in accordance with negative signals fed to said tube, means for scanning said writing beams simultaneously across said storage target in such manner that one beam scans said material between one of said control electrodes and said elements while the other scans said material between the other control electrode and said elements; means for applying bias voltages of opposite polarity to said control electrodes during writing, means for subsequently scanning said reading beam across said elements; and means for taking output signals from said target.

11. An arrangement as claimed in claim 10, wherein said bias voltages are of equal magnitude.

12. An arrangement as claimed in claim 10, wherein said storage target includes a signal plate and wherein the means for taking ouput signals from said target includes means for applying a single potential to both said control electrodes, and to said signal plate during reading, and means for taking output signals from said control electrodes.

References Cited in the file of this patent

UNITED STATES PATENTS

| | | |
|---|---|---|
| 2,527,632 | Graham | Oct. 31, 1950 |
| 2,588,292 | Rittner | Mar. 4, 1952 |
| 2,618,762 | Snyder | Nov. 18, 1952 |
| 2,618,763 | Snyder | Nov. 18, 1952 |
| 2,776,371 | Clogston | Jan. 1, 1957 |
| 2,857,551 | Hansen | Oct. 21, 1958 |